(12) United States Patent
Kim

(10) Patent No.: US 10,236,116 B2
(45) Date of Patent: Mar. 19, 2019

(54) POWER SUPPLY APPARATUS FOR VEHICLE AND INSULATION STRUCTURE APPLIED TO THE SAME

(71) Applicant: HYUNDAI MOBIS CO., LTD., Seoul (KR)

(72) Inventor: Do-Hyun Kim, Anyang-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 770 days.

(21) Appl. No.: 14/793,038

(22) Filed: Jul. 7, 2015

(65) Prior Publication Data
US 2016/0012964 A1 Jan. 14, 2016

(30) Foreign Application Priority Data
Jul. 10, 2014 (KR) .................. 10-2014-0086647

(51) Int. Cl.
*H02K 3/28* (2006.01)
*H01F 27/32* (2006.01)
(Continued)

(52) U.S. Cl.
CPC ........... *H01F 27/325* (2013.01); *H01F 27/29* (2013.01); *H02K 3/28* (2013.01); *H02K 1/12* (2013.01); *H02K 1/185* (2013.01); *H02K 3/34* (2013.01); *H02K 3/345* (2013.01); *H02K 3/38* (2013.01); *H02K 3/46* (2013.01); *H02K 3/50* (2013.01); *H02K 3/51* (2013.01); *H02K 3/52* (2013.01); *H02K 3/522* (2013.01); *H02K 5/22* (2013.01);
(Continued)

(58) Field of Classification Search
CPC .......... H02K 1/12; H02K 1/185; H02K 11/00; H02K 2203/09; H02K 3/28; H02K 3/34; H02K 3/345; H02K 3/50; H02K 3/522; H02K 5/22; H02K 5/225
USPC ..................................................... 310/43, 71
See application file for complete search history.

(56) References Cited

U.S. PATENT DOCUMENTS 9,203,275 B2 * 12/2015 Kanada .................. H02K 3/522
2006/0043806 A1 * 3/2006 Torii ...................... H02K 3/522
310/71
(Continued)

FOREIGN PATENT DOCUMENTS

| CN | 102088219 A | 6/2011 |
|---|---|---|
| CN | 102195382 A | 9/2011 |
| KR | 10-2014-0003778 A | 1/2014 |

*Primary Examiner* — Bernard Rojas
*Assistant Examiner* — Rashad H Johnson
(74) *Attorney, Agent, or Firm* — NSIP Law

(57) ABSTRACT

A power supply apparatus for a vehicle is provided. The power supply apparatus includes a plurality of bobbins around which coils are wounded, a bobbin assembling plate configured to be integrally formed with the plurality of bobbins, a support body configured to support the bobbin assembling plate, a connection housing configured to have a plurality of phase electrode terminals connected to a plurality of connecting terminals, which are installed at one side of an upper end of the support body, and to connect ends of the coils wound around the plurality of bobbins and a plurality of insulators having the plurality of phase electrode terminals alternately disposed sequentially therein and disposed between the plurality of phase electrode terminals, and a housing cover configured to form an outer cover of the connection housing and an outer cover of the support body.

20 Claims, 7 Drawing Sheets

(51) Int. Cl.
*H01F 27/29* (2006.01)
*H02K 3/52* (2006.01)
*H02K 5/22* (2006.01)
*H02K 1/12* (2006.01)
*H02K 3/34* (2006.01)
*H02K 3/38* (2006.01)
*H02K 3/51* (2006.01)
*H02K 3/50* (2006.01)
*H02K 1/18* (2006.01)
*H02K 3/46* (2006.01)

(52) U.S. Cl.
CPC ......... *H02K 5/225* (2013.01); *H02K 2203/09* (2013.01)

(56) References Cited

U.S. PATENT DOCUMENTS

| | | | |
|---|---|---|---|
| 2010/0060090 A1* | 3/2010 | Sakata | H02K 3/522 310/71 |
| 2010/0107401 A1* | 5/2010 | Suzuki | H02K 1/148 29/596 |
| 2010/0201213 A1* | 8/2010 | Kataoka | H02K 3/522 310/71 |
| 2011/0133581 A1* | 6/2011 | Ha | H02K 3/522 310/71 |
| 2011/0215662 A1* | 9/2011 | Lee | H02K 3/38 310/71 |
| 2016/0036278 A1* | 2/2016 | Kim | H02K 3/522 310/43 |

\* cited by examiner

POWER SUPPLY APPARATUS FOR VEHICLE AND INSULATION STRUCTURE APPLIED TO THE SAME

CROSS-REFERENCE(S) TO RELATED APPLICATIONS

This application claims the benefit under 35 USC 119(a) of Korean Patent Application No(s). 10-2014-0086647, filed on Jul. 10, 2014 in the Korean Intellectual Property Office, the entire disclosure of which is incorporated herein by reference for all purposes.

BACKGROUND

1. Field

Embodiments of the present application relate to a power supply apparatus applied to a motor for a vehicle.

2. Description of Related Art

Generally, a motor includes a stator which is equipped on a motor housing, a frame, or the like, a magnet rotor which is rotatably inserted into the stator, and a shaft which is fixedly inserted into a central portion of the magnet rotor. The stator has a form in which a coil is wound around a stator core.

Among these motors, a distributed winding type motor and a concentrated winding type motor have been used in a vehicle. Generally, however, the distributed winding type motor has a structure in which a separate coil connection is not required. Unlike this, in the case of the concentrated winding type motor, there is a need to connect between a connecting terminal and a coil.

In particular, in a driving motor to which a split core is applied, the coil is wound around a stator core and an end of the coil is aligned in a straight direction and then is assembled with the connecting terminal. Next, an electrical pass is connected to the connecting terminal by a bonding method (e.g., fusing, welding, pressing, etc.).

In this connection, each of the connecting terminals is merely press-fitted in slots and therefore it is likely to separate the connecting terminals from the slots due to a shock. In other words, it is highly likely to increase fracture possibility due to stress concentration and/or fatigue at a bonded portion which is caused by a great shock and/or a frequent vibration in a vertical direction depending on a driving of a vehicle.

Further, phase N, U, V, and W electrode terminals which are connected to each of the connecting terminals need to be fixed at a predetermined interval from each other. However, according to the related art, the fixing is made by disposing the phase N, U, V, and W electrode terminals in advance and then press-fitting insulators between these phase N, U, V, and W electrodes, terminals to be inserted therebetween.

In this case, the insulators are not easily press-fitted between the phase N, W, V, and U electrode terminals and therefore the insulators are applied with an excessive force, such that an assembling work process may not be easily performed.

Further, as the insulators are applied with the excessive force, a damage risk and product defects may be increased.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a power supply apparatus for a vehicle may include, a plurality of bobbins around which coils are wound, a bobbin assembling plate configured to be integrally formed with the plurality of bobbins, a support body configured to support the bobbin assembling plate; a connection housing configured to have a plurality of phase electrode terminals connected to a plurality of connecting terminals, which are installed at one side of an upper end of the support body, and to connect ends of the coils wound around the plurality of bobbins and a plurality of insulators having the plurality of phase electrode terminals alternately disposed sequentially therein and disposed between the plurality of phase electrode terminals, and a housing cover configured to form an outer cover of the connection housing and an outer cover of the support body.

The power supply apparatus may have a plurality of insulators including ends provided with inclined surfaces configured to facilitate an insertion of the plurality of phase electrode terminals.

The power supply apparatus may include a plurality of insulators having a "T" shaped cross section so as to have one side of the plurality of phase electrode terminals seated thereon.

The power supply apparatus may include both sides of a lower end inside the connection housing provided with a plurality of steps having another side of the plurality of phase electrode terminals seated thereon.

The power supply apparatus may include a plurality of insulators having an "L" shaped cross section.

The power supply apparatus may have the lower end inside the connection housing provided with one step so as to have another side of the plurality of phase electrode terminals seated thereon.

The power supply apparatus may include the plurality of insulators and the plurality of phase electrode terminals as having an annular shape.

The power supply apparatus may include a material of the plurality of insulators as being a polyphthalamide (PPA) resin.

The power supply apparatus may include the plurality of insulators and the plurality of phase electrode terminals as being assembled inside the connection housing.

The power supply apparatus may include the plurality of insulators and the plurality of phase electrode terminals as being inserted inside the connection housing in a manner requiring that the plurality of insulators and the plurality of phase electrode terminals may be assembled in advance outside the connection housing.

The power supply apparatus may include the plurality of insulators as having a 4 split structure and a diameter which is controlled when being assembled with the plurality of phase electrode terminals.

The power supply apparatus may include the end of the coil as having an "S" shape to spread over one side of an upper end of the bobbin assembling plate.

The power supply apparatus may include the plurality of connecting terminals having an "L" shape.

The power supply apparatus may include the plurality of connecting terminals as having a curved portion that is curved once at an angle of 90° and have a cap shape.

The power supply apparatus may include the end of the coil, the connecting terminal, and the fusing terminal as being fused simultaneously.

The power supply apparatus may include the fusing terminal as being plated with tin.

The power supply apparatus may include the coil as being a circular coil or a quadrangular coil.

In another general aspect, an insulating structure may be applied to a power supply apparatus for a three-phase driving motor having four phase electrode terminals of an annular shape and a connection housing provided therewith, wherein the insulating structure has a "T" shaped cross section so as to have one side of the four phase electrode terminals seated thereon and having both ends shaped in the form of an "I" in the "T" shape and provided with an inclined surface when the four phase electrode terminals are inserted thereinto and disposed in the connection housing in advance before the four phase electrode terminals are inserted thereinto.

In yet another general aspect, an insulating structure may be applied to a power supply apparatus for a three-phase driving motor having four phase electrode terminals of an annular shape and a connection housing provided therewith, wherein the insulating structure has an "L"-letter shaped cross section so as to have one side of the four phase electrode terminals seated thereon and having both ends shaped in the form of an "I" in the "L"-letter shape and provided with an inclined surface when the four phase electrode terminals are inserted thereinto and disposed in the connection housing in advance before the four phase electrode terminals are inserted Other features and aspects will be apparent from the following detailed description, the drawings, and the claims.

DETAILED DESCRIPTION

Figure 1:
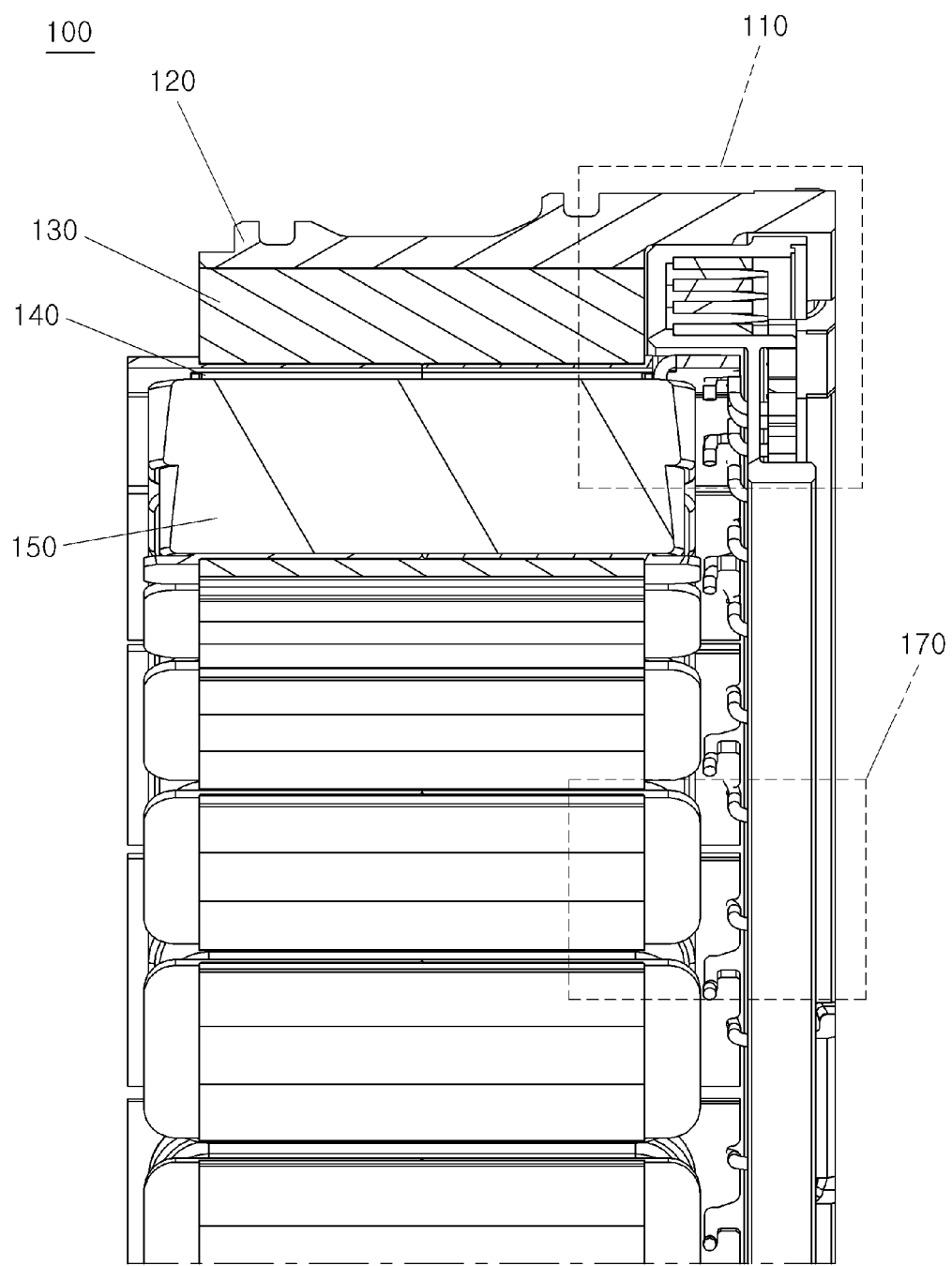
FIG. 1 is a cross-sectional view illustrating an example of a power supply apparatus for a vehicle.

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Throughout the accompanying drawings, the same reference numerals will be used to describe the same components.

Terms used in the specification, 'first', 'second', etc., may be used to describe various components, but the components are not to be interpreted to be limited to the terms. The terms are used to distinguish one component from another component.

Therefore, the first component may be referred to as the second component, and the second component may be referred to as the first component. The term 'and/or' includes a combination of a plurality of items or any one of a plurality of terms.

Unless indicated otherwise, it is to be understood that all the terms used in the specification including technical and scientific terms has the same meaning as those that are understood by those who skilled in the art.

Hereinafter, a power supply apparatus for a vehicle and an insulation structure applied to the same according to an embodiment of the present application will be described in detail with reference to the accompanying drawings.

FIG. 1 is a cross-sectional view illustrating an example of a power supply apparatus for a vehicle.

Figure 2:
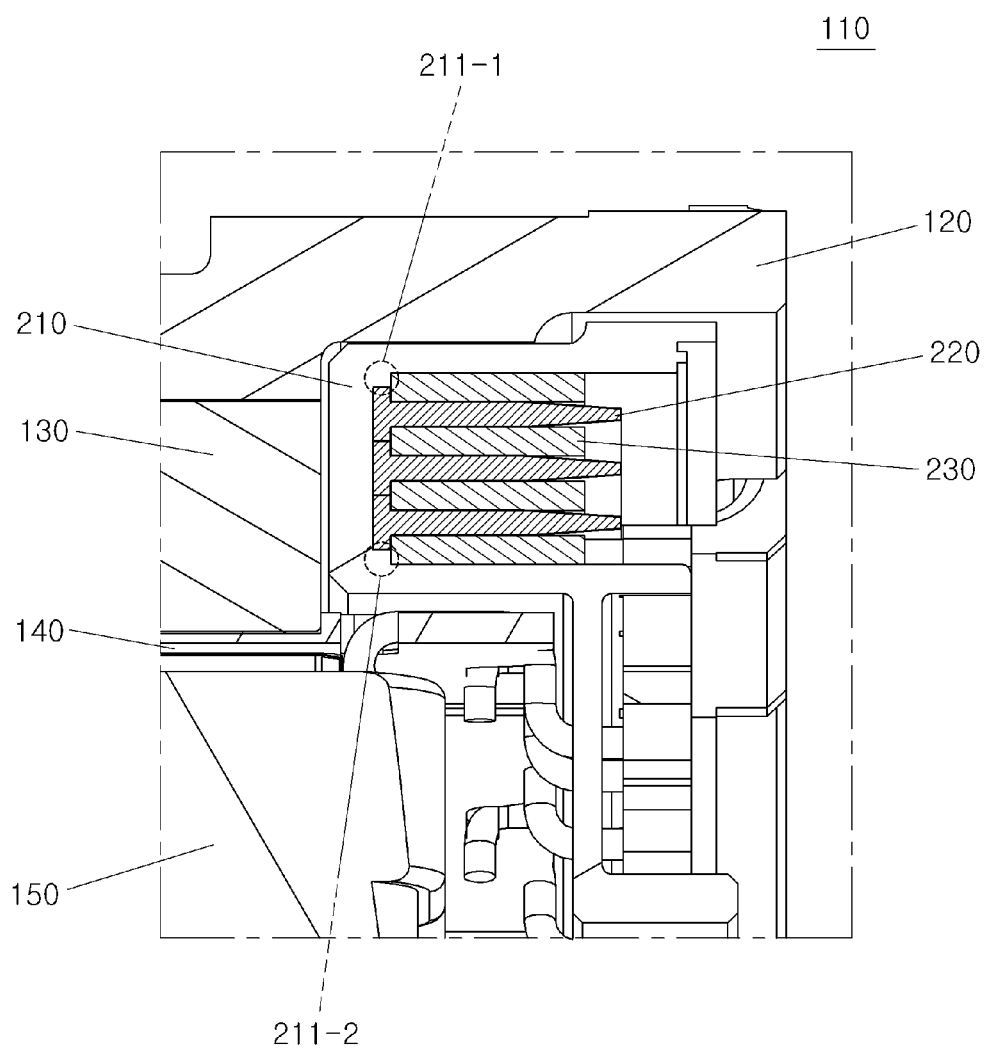
FIG. 2 is an enlarged view illustrating an example of a connection housing part illustrated in FIG. 1.

FIG. 2 is an enlarged view illustrating an example of a connection housing part illustrated in FIG. 1.

Figure 3:
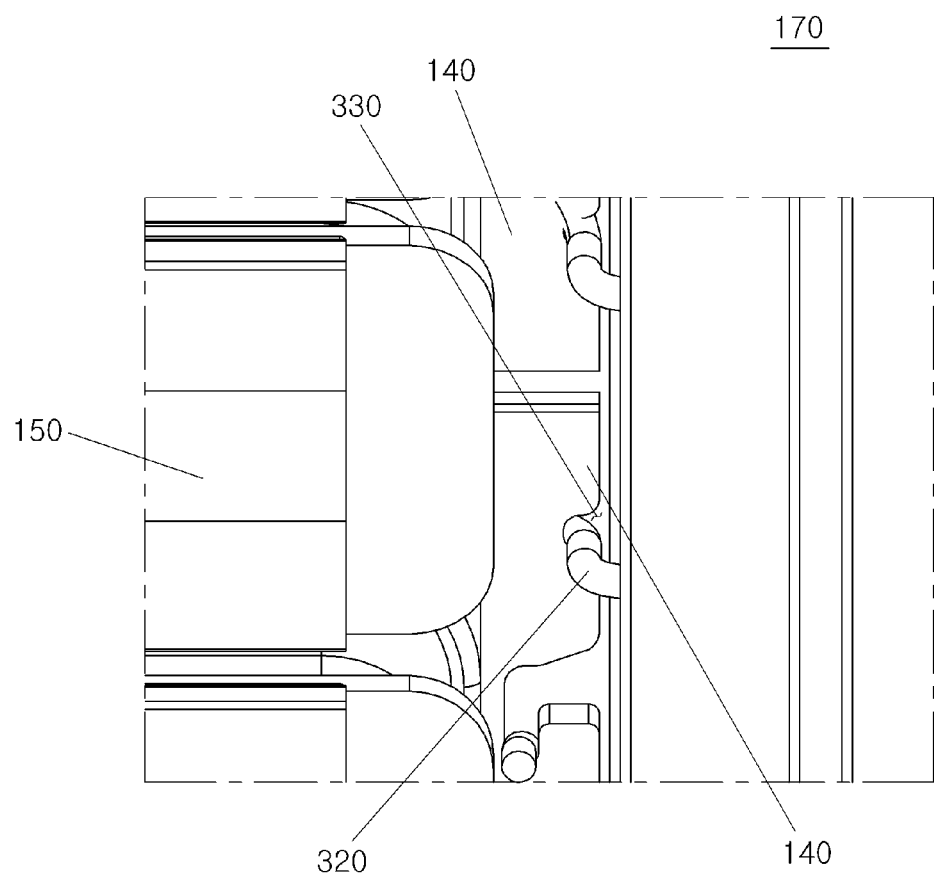
FIG. 3 is an enlarged view illustrating an example of a stator coil part illustrated in FIG. 1.

Referring to FIGS. 1 and/or 2, the power supply apparatus 100 for a vehicle is configured to include a plurality of bobbins 150 around which the coils are wound, a bobbin assembling plate 140 integrally provided with the plurality of bobbins 150, a support body 130 supporting the bobbin assembling plate 140, a connection housing 210 (FIG. 2) installed at one side of an upper end of the support body 130 and connecting between the coils wound around the plurality of bobbins 150, a housing cover 120 forming an appearance of the support body 130 and the connection housing 210. A partial enlarged view 170 of a stator coil of the power supply apparatus is shown in FIG. 3.

The power supply apparatus 100 for a vehicle illustrated in FIG. 1 is a power supply apparatus which is applied to a concentrated winding type motor. An example of a green car may include a Hybrid Electric Vehicle (HEV), a Plug-In Hybrid Electric Vehicle (PHEV), an Electric Vehicle (EV), a Neighborhood Electric Vehicle (NEV), a Fuel-Cell Vehicle (FCV), etc.

Referring again to FIG. 1, the support body 130, the bobbin assembling plate 140, and the bobbin 150 are integrally formed. Further, a method for separately forming the housing cover 120, the support body 130, the bobbin assembling plate 140, and the bobbin 150 and bonding them may also be possible.

The support body 130 and an upper end of the bobbin 150 are provided with the connection housing 210. FIG. 2 illustrates a detailed configuration of the connection housing 210.

The connection housing 210 is provided with a plurality of phase electrode terminals 230 connected to a plurality of connecting terminals (not illustrated) which connect ends of the coils wound around the plurality of bobbins 150 (FIG. 1) and a plurality of insulators 220 having the plurality of phase electrode terminals 230 alternately disposed sequentially therein and disposed between the plurality of phase electrode terminals.

The phase electrode terminal 230 is configured of an N phase electrode terminal, a U phase electrode terminal, a V phase electrode terminal, and a W phase electrode terminal which are sequentially disposed from the left. Further, the phase electrode 230 is an annular shape.

The insulators 220 are disposed between the phase electrode terminals 230 to insulate and/or keep therebetween at a predetermined interval.

The insulator 220 has a "T"-letter shaped cross section to have one side of the phase electrode terminal 230 seated thereon. That is, when turning the "T"-letter shape upside down, both sides of a lower end of the insulator 220 are each formed with a step on which one side of the phase electrode terminal 230 is seated.

Further, both sides of an end having an "I"-letter shape in the "T"-letter shape are provided with an inclined surface so that the phase electrode terminal 230 is easily assembled with the insulator 220. Therefore, the insulator 220 is disposed in the connection housing 210 in advance before the phase electrode terminal 230 is inserted and assembled and the insulators 220 are alternately assembled sequentially with the phase electrode terminals 230.

In an embodiment, both sides of a lower end inside the connection housing 210 are provided with a first step 211-1 and a second step 211-2.

In other words, three insulators 220 are disposed between the first step 211-1 and the second step 211-2. When the three insulators 220 are defined as a first insulator, a second insulator, and a third insulator from the left, an upper end of the first step 211-1 is seated with a portion of the phase electrode terminal 230 and the rest portion thereof is seated with the first insulator.

Therefore, the insulator has a structure in which one insulator is disposed between the two phase electrode terminals.

The insulator 220 may have an "L"-letter shaped cross section in addition to the "T"-letter shape. In this case, both sides of an end having the "I"-letter shape in the "L"-letter shape are provided with an inclined surface. Therefore, the insulator is disposed in the connection housing 210 in advance before the phase electrode terminal 230 is inserted and assembled and the insulators are alternately assembled sequentially with the phase electrode terminals 230.

In an embodiment, one side of the lower end inside of the connection housing 210 is provided with a step. In other words, the step is formed at the left of the connection housing 210 and the three insulators having the "L"-letter shape are successively disposed from the step In this case, one phase electrode terminal is seated on an upper end of the step and one phase electrode terminal is seated on each insulator.

The inclined surface formed at the end of the insulator 220 facilitates the assembling of the phase electrode terminal 230. In other words, when the phase electrode terminal 230 is press-fitted in the insulator 220 to be assembled with the insulator 230 in the state in which there is no inclined surface, the phase electrode terminal is locked to the insulator 220. In this case, a force for press-fitting is increased, and as a result, the phase electrode terminal 230 and/or the insulator 220 may be deformed, damaged, and the like.

With reference to FIG. 2, an assembling structure of the insulator 220 with the phase electrode terminal 230 is diverse. In other words, the insulators 220 are disposed within the connection housing 210 in advance and may be inserted between the phase electrode terminals 230 to be assembled with the phase electrode terminals 230.

Alternatively, the insulator 220 and the phase electrode terminal 230 are assembled with each other outside the connection housing 210 and then may be inserted into the connection housing 210. In this case, the insulators may be fixed between the phase electrode terminals by using an adhesive between the insulators and the phase electrode terminals. In this case, the insulator and the phase electrode terminal turn upside down and are assembled with each other, and then may be inserted into the connection housing 210 reversely.

Here, both of the insulator 220 and the phase electrode terminal 230 may be an annular shape. Further, four phase electrode terminal are configured to have different diameters.

Further, when the insulator and the phase electrode terminal are assembled and installed inside the connection housing 210, a thermosetting mold material is injected into the connection housing 210 and then is hardened.

Referring again to FIG. 2, as a material of the insulator 220, a polyphthalamide (PPA) resin may be used. Further, the insulator 220 has a four-spilt structure and has a diameter which may be controlled at the time of assembling. Therefore, the insulator 220 may have the same size, unlike the phase electrode terminal 230.

FIG. 3 is an enlarged view illustrating an example of a stator coil part illustrated in FIG. 1.

Referring to FIG. 3, illustrating a portion of the stator coil 170 of the apparatus of FIG. 1, an end 320 of the coil in the coil wound around the bobbin 150 is in a state in which it is locked to a fixed groove 330 which is formed at one side of the upper end of the bobbin assembling plate 140.

Figure 4:
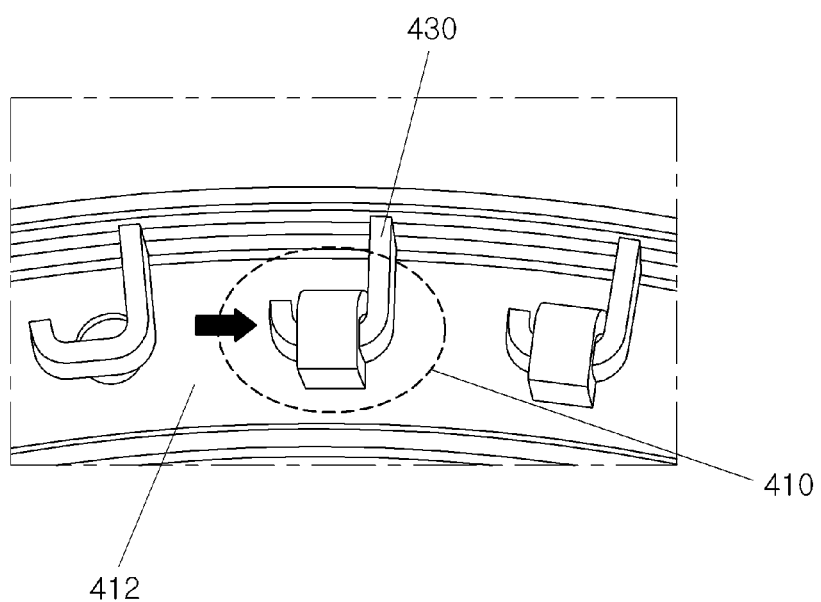
FIG. 4 is a partial perspective view illustrating an example of a fixed structure in which a connecting terminal is connected to an end of a stator coil.

Further, the end 320 of the coil is coupled with the connecting terminal which is disposed on the connection housing 210 (FIG. 1). This is shown in FIG. 4. FIG. 4 will be described below.

Referring again to FIG. 3, the coil is wound around the bobbin 150 and then a shape and a structure of the end 320 of the coil are formed in an "S"-letter shape. In other words, the end 320 of the wound coil has a predetermined shape to be formed in a specific shape. That is, a first curved portion (not illustrated) and a second curved portion (not illustrated) which have an angle of 90° are formed in different directions. Therefore, the first and second curved portions have a similar shape to the "S"-letter shape.

FIG. 4 is a partial perspective view illustrating an example of a fixed structure in which the connecting terminal is connected to an end of the stator coil.

Figure 5:
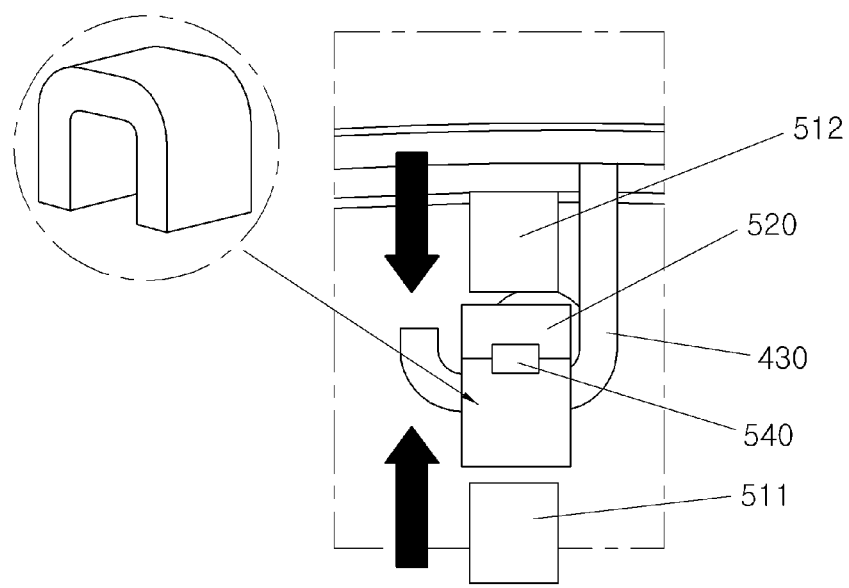
FIG. 5 is a partial enlarged view illustrating an example of the fixed structure illustrated in FIG. 4.

Referring to FIG. 4, a connecting terminal 430 is bonded to an upper end 412 of the connection housing. A partial enlarged view 410 thereof is illustrated in FIG. 5. Here, a shape of the connecting terminal 430 is similar to the "L"-letter shape.

FIG. 5 is a partial enlarged view illustrating an example of the fixed structure illustrated in FIG. 4.

Referring to FIG. 5, in the partial enlarged view illustrating the example of the fixed structure 410 illustrated in FIG. 4, the connecting terminal 430 is positioned like being locked to a coil bonding part 540 of the end 320 of the protruding coil and is bonded thereto while being covered with a fusing terminal 520.

In an embodiment, a first electrode 512 and a second electrode 511 for fusing are configured up and down, having the fusing terminal 520 disposed therebetween. Therefore, an electrode operation is performed up and down.

Here, as a material of the fusing terminal 520, tin plating, and the like, having excellent electric conductivity may be used.

Further, the bonding among the coil bonding part 540, the connecting terminal 430, and the fusing terminal 520 is made simultaneously. As the bonding method, the fusing method is mainly used, but embodiments of the present application are not limited thereto, and therefore a welding method, a pressing method, and the like may be used.

Figure 6:
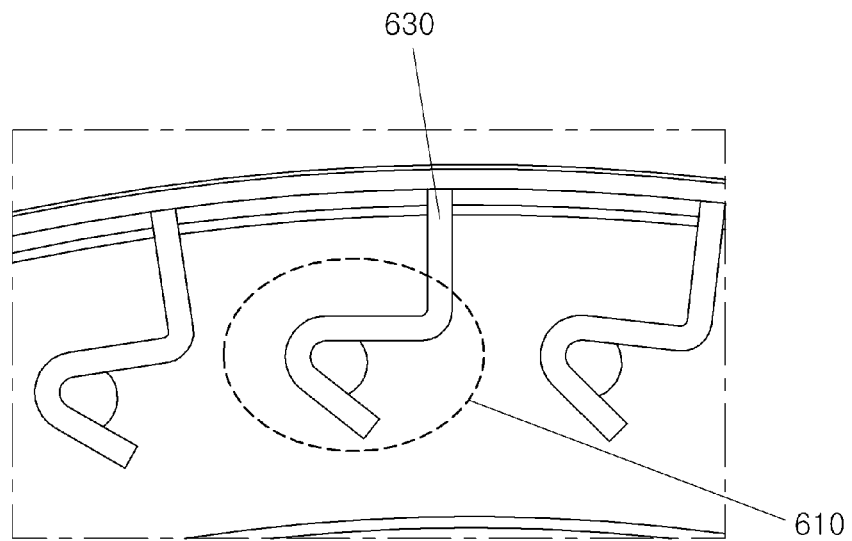
FIG. 6 is a partial perspective view illustrating an example of a fixed structure in which a connecting terminal is connected to an end of a stator coil.

FIG. 6 is a partial perspective view illustrating an example of a fixed structure in which a connecting terminal is connected to an end of a stator coil.

Figure 7:
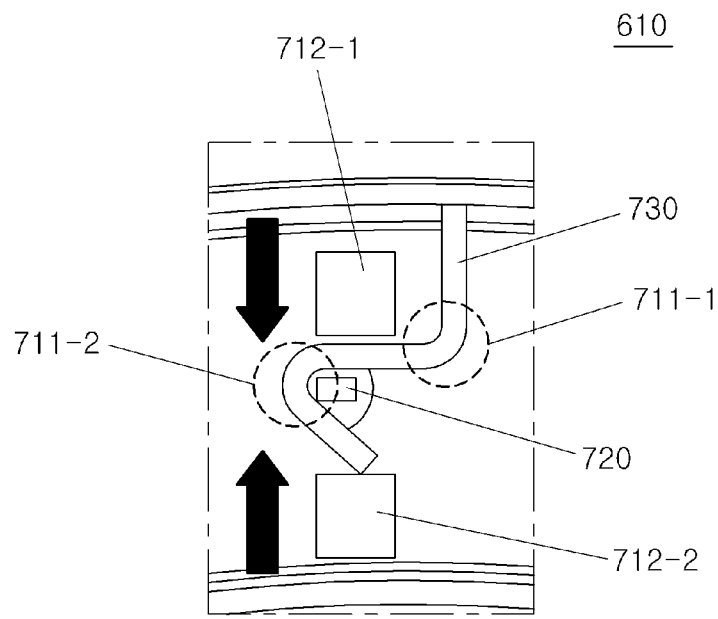
FIG. 7 is a partial enlarged view illustrating an example of the fixed structure illustrated in FIG. 6.

Referring to FIG. 6, the connecting terminal 430 is bonded to the upper end of the connection housing. A partial enlarged view 610 thereof is illustrated in FIG. 7. Here, a connecting terminal 630 has a shape in which a curved portion curved once at an angle of 90° and an end has a cap shape.

FIG. 7 is a partial enlarged view illustrating an example of the fixed structure illustrated in FIG. 6.

Referring to FIG. 7, in the partial enlarged view illustrating the example of the fixed structure 610, the fixed structure has a shape in which a curved portion 711-1 is curved once at an angle of 90° and the end has a cap shape 711-2. Further, the first electrode 712-1 and the second electrode 712-2 for bonding are configured up and down, having a connecting terminal 730 disposed therebetween. Even in this case, the connecting terminal 730 and the coil bonding part 720 may be bonded to each other.

FIGS. 4 to 7 disclose the case in which the coil is a circular coil, but a case in which the coil is a quadrangular coil may be identically applied. However, describing different points, a quadrangular line of the quadrangular coil has a rectangular shape and the end of the coil is formed toward a wide side direction of the quadrangular coil. Further, a terminal, a coil, and a fusing terminal are simultaneously bonded to one another by using the tin-plated fusing terminal.

Therefore, even though a great shock and/or a frequent vibration is generated in a vertical direction, the end of the S-letter coil performs a damper function and therefore the stress of the bonded part is dispersed, and as a result, the fatigue fracture possibility may be remarkably reduced.

Further, the connecting terminal is at a regular position when a thermal shock (sudden change in temperature) occurs and the stress of the bonded part due to the contraction and/or expansion of the coil is absorbed at the end of the S-letter coil, and as a result, the fatigue fracture possibility may be reduced.

Further, the size of the connecting terminal which is a relative assembling product may be reduced depending on the reduction in a radius of the end of the coil, and as a result, a weight may be reduced.

According to embodiments of the present application, the shape and structure of the end of the wound coil are changed and then the coil is bonded to each of the connecting terminals, and as a result, it is possible to remarkably reduce the fatigue fracture possibility by distributing the stress of the bonded portion even though the great shock and/or the frequent vibration occur in the vertical direction depending on the driving of the vehicle.

Further, according to embodiments of the present application, the ends of the insulators are formed to have a predetermined angle to be first disposed and the W, V, and U phase electrode terminals are inserted between the disposed insulators, thereby facilitating the assembling work process.

Figure 8:
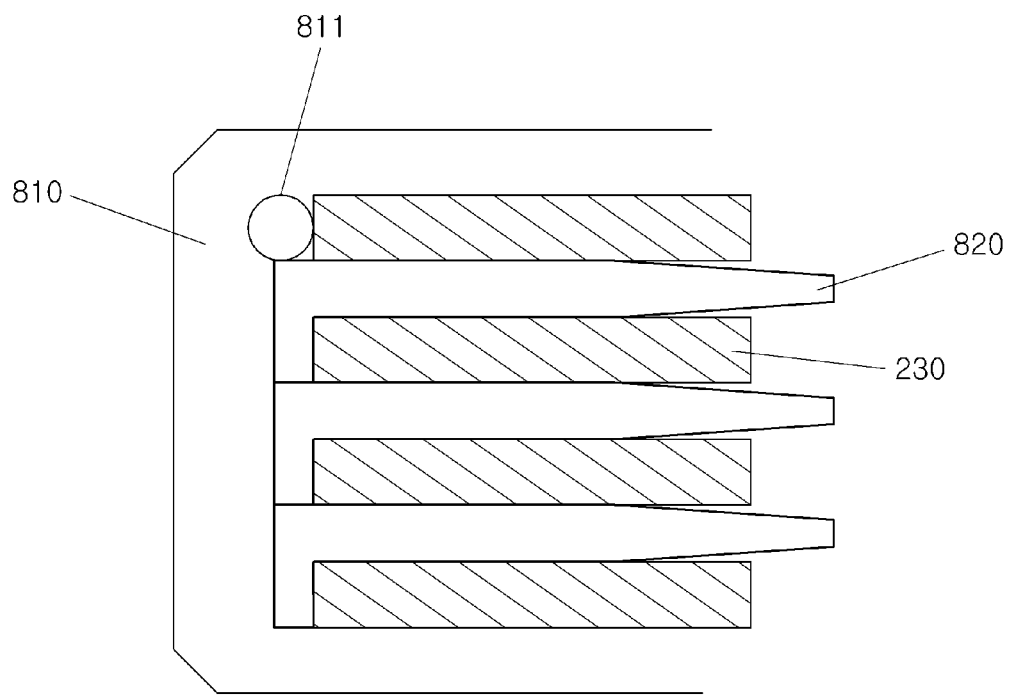
FIG. 8 is an enlarged view illustrating another example of a connection housing.

FIG. 8 is an enlarged view illustrating another example of a connection housing.

Referring to FIG. 8, as in FIG. 2, a connection housing 810 may be disposed to include a support body 230 connecting between coils wound around insulator 820. One end inside the connection housing 210 is provided with a step 811.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A power supply apparatus for a vehicle, the apparatus comprising:
    bobbins;
    insulators;
    coils wound around the bobbins;
    a bobbin assembling plate integrally formed with the bobbins;
    a support body supporting the bobbin assembling plate;
    a connection housing comprising phase electrode terminals, and connecting the insulators to ends of the coils; and
    a housing cover covering the connection housing and the support body,
    wherein the phase electrode terminals are connected to connecting terminals disposed at a side of an upper end of the support body,
    wherein each of the insulators comprises a first segment and a second segment perpendicularly extending from the first segment to form a "T" cross section, and the insulators are arranged such that adjacent first segments among the first segments abut each other and are linearly aligned, and
    wherein the phase electrode terminals are disposed between adjacent second segments among the second segments.

2. The apparatus of claim 1, wherein the second segments are tapered to facilitate insertion of the phase electrode terminals.

3. The apparatus of claim 2, wherein a side of the phase electrode terminals is seated on the insulators.

4. The apparatus of claim 3, wherein
    both sides of a lower end inside the connection housing are provided with steps, and
    another side of the phase electrode terminals are seated on the steps.

5. The apparatus of claim 1, wherein
    a lower end inside the connection housing comprises a step, and
    a phase electrode terminal, among the phase electrode terminals, is seated on the step.

6. The apparatus of claim 1, wherein the insulators and the phase electrode terminals comprise an annular shape.

7. The apparatus of claim 1, wherein insulators are made of a polyphthalamide (PPA) resin.

8. The apparatus of claim 1, wherein the insulators and the plurality phase electrode terminals are assembled inside the connection housing.

9. The apparatus of claim 1, wherein the phase electrode terminals are assembled outside the connection housing before the insulators and the phase electrode terminals are inserted into the connection housing.

10. The apparatus of claim 1, wherein the insulators comprise a 4-split structure.

11. The apparatus of claim 1, wherein the ends of the coils comprise an "S" shape and are spread over a side of an upper end of the bobbin assembling plate.

12. The apparatus for a vehicle of claim 1, wherein the connecting terminals comprise an "L" shape.

13. The apparatus of claim 1, wherein the connecting terminals comprise a curved portion with an angle of 90°, and have a cap shape.

14. The apparatus of claim 1, further comprising:
a fusing terminal fastening the end of the coil and the connecting terminal.

15. The apparatus of claim 14, wherein the end of the coil, the connecting terminal, and the fusing terminal are simultaneously fused.

16. The apparatus of claim 14, wherein the fusing terminal is plated with tin.

17. The apparatus of claim 1, wherein the coil comprises a circular coil or a quadrangular coil.

18. The apparatus of claim 1, wherein a first segment, among the first segments, of a peripheral insulator, among the insulators, terminates midway past an end of a peripheral phrase electrode terminal, among the phase electrode terminals, such that a step is formed between the peripheral insulator and the peripheral phase electrode terminal.

19. An insulating structure, comprising:
insulators, each comprising a first segment and a tapered second segment perpendicularly extending from the first segment to form a "T" cross section, wherein the insulators are arranged such that adjacent first segments among the first segments abut each other and are linearly aligned; and
spaces configured to accommodate phase electrode terminals between adjacent second segments among the second segments.

20. An insulating structure, comprising:
insulators, each comprising a first segment and a tapered second segment perpendicularly extending from the first segment to form an "L" cross section, wherein the insulators are arranged such that adjacent first segments among the first segments abut each other and are linearly aligned; and
spaces configured to accommodate phase electrode terminals between adjacent second segments among the second segments.

* * * * *